United States Patent [19]
DeCecca

[11] Patent Number: 5,937,208
[45] Date of Patent: Aug. 10, 1999

[54] FILM SCROLLING METHOD, APPARATUS AND CAMERA

[75] Inventor: Michael L. DeCecca, Fairport, N.Y.

[73] Assignee: Eastman Kodak Company, Rochester, N.Y.

[21] Appl. No.: 08/848,443

[22] Filed: May 8, 1997

[51] Int. Cl.⁶ .................................................. G03B 17/02
[52] U.S. Cl. ........................... 396/6; 396/538; 242/332.3
[58] Field of Search ............................. 396/6, 535, 538, 396/541; 242/332.3, 532.2, 532.7, 562.1, 564

[56] References Cited

U.S. PATENT DOCUMENTS

| | | |
|---|---|---|
| 651,118 | 6/1900 | Pascal et al. . |
| 1,921,559 | 8/1933 | Case . |
| 1,921,560 | 8/1933 | Case . |
| 2,484,248 | 10/1949 | Roehrl . |
| 3,057,573 | 10/1962 | Kindig et al. . |
| 3,288,389 | 11/1966 | Gersch et al. . |
| 3,383,064 | 5/1968 | Daly et al. . |
| 3,567,147 | 3/1971 | Engelsmann et al. . |
| 3,643,889 | 2/1972 | Krause . |
| 3,748,715 | 7/1973 | Hoover et al. . |
| 3,850,381 | 11/1974 | Moore . |
| 3,925,798 | 12/1975 | Sanada et al. . |
| 3,930,296 | 1/1976 | Hoover . |
| 3,999,197 | 12/1976 | Iwashita et al. . |
| 4,102,512 | 7/1978 | Lewallyn . |
| 4,171,892 | 10/1979 | Kozuki et al. . |
| 4,205,436 | 6/1980 | Klotz et al. . |
| 4,228,579 | 10/1980 | Dunkel et al. . |
| 4,251,148 | 2/1981 | Stemme et al. . |
| 4,256,269 | 3/1981 | Feighery et al. . |
| 4,274,726 | 6/1981 | Yoneyama et al. . |
| 4,303,325 | 12/1981 | Seely . |
| 4,342,509 | 8/1982 | Wakabayashi et al. . |
| 4,451,011 | 5/1984 | Engelsmann et al. . |
| 4,455,074 | 6/1984 | Wong et al. . |
| 4,687,311 | 8/1987 | Desormeaux . |

(List continued on next page.)

FOREIGN PATENT DOCUMENTS

| | | |
|---|---|---|
| 0743 546 A1 | 11/1996 | European Pat. Off. . |
| 0 750 216 A1 | 12/1996 | European Pat. Off. . |
| 38-20424 | 10/1963 | Japan . |
| 63-271325 | 11/1988 | Japan . |
| 3-2741 | 1/1991 | Japan . |
| 3-2751 | 1/1991 | Japan . |
| 3-2752 | 1/1991 | Japan . |
| 5-134361 | 5/1993 | Japan . |
| 5-323517 | 12/1993 | Japan . |
| 6-130568 | 5/1994 | Japan . |
| 6-289541 | 10/1994 | Japan . |
| 6-295020 | 10/1994 | Japan . |
| 6-295022 | 10/1994 | Japan . |
| 6-332118 | 12/1994 | Japan . |
| 7-13279 | 1/1995 | Japan . |

(List continued on next page.)

OTHER PUBLICATIONS

U.S. application No. 08/569,634, filed Dec. 08, 1995.
U.S. application No. 08/607,844, filed Feb. 27, 1996.

Primary Examiner—Howard B. Blankenship
Attorney, Agent, or Firm—Robert Luke Walker

[57] ABSTRACT

A method and apparatus for loading photographic film in a camera and cameras so produced. In the method, a camera frame assembly is supplied. The camera frame assembly includes a camera frame having a cartridge chamber, a scroll chamber, and an intermediate section disposed between the two chambers. The scroll chamber has a wall that defines a substantially cylindrical, empty film space. A film cartridge having a filmstrip, is placed in the cartridge chamber. The filmstrip is advanced from the cartridge to the scroll chamber. A major portion of the filmstrip is coiled into a scroll within the film space. During the coiling, the scroll is supported within the film space on a fluid bearing between the scroll chamber wall and the filmstrip.

29 Claims, 9 Drawing Sheets

U.S. PATENT DOCUMENTS

| | | |
|---|---|---|
| 4,699,489 | 10/1987 | Nii . |
| 4,833,495 | 5/1989 | Ohmura et al. . |
| 4,838,497 | 6/1989 | Kramer et al. . |
| 4,884,087 | 11/1989 | Mochida et al. . |
| 4,890,130 | 12/1989 | Takei et al. . |
| 4,954,857 | 9/1990 | Mochida et al. . |
| 4,965,616 | 10/1990 | Horiuchi . |
| 4,972,649 | 11/1990 | Mochida et al. . |
| 5,016,833 | 5/1991 | Hamlin . |
| 5,049,908 | 9/1991 | Murakami . |
| 5,063,400 | 11/1991 | Takei . |
| 5,125,630 | 6/1992 | Hoyt et al. . |
| 5,131,592 | 7/1992 | Shibata et al. . |
| 5,257,748 | 11/1993 | Morizzo . |
| 5,301,892 | 4/1994 | Merz et al. . |
| 5,311,231 | 5/1994 | Suzuki et al. . |
| 5,544,833 | 8/1996 | Zander . |
| 5,608,482 | 3/1997 | Watkins et al. . |

FOREIGN PATENT DOCUMENTS

| | | |
|---|---|---|
| 7-5526 | 1/1995 | Japan . |
| 7-209721 | 8/1995 | Japan . |
| 7-219156 | 8/1995 | Japan . |
| 8-171180 | 7/1996 | Japan . |
| 8-171181 | 7/1996 | Japan . |
| 8-262633 | 10/1996 | Japan . |
| 8-262636 | 10/1996 | Japan . |
| 8-314071 | 11/1996 | Japan . |
| 9-43777 | 2/1997 | Japan . |
| 9-43778 | 2/1997 | Japan . |
| 9-43779 | 2/1997 | Japan . |
| 558515 | 1/1944 | United Kingdom . |
| 1060937 | 3/1967 | United Kingdom . |

FILM SCROLLING METHOD, APPARATUS AND CAMERA

FIELD OF THE INVENTION

The invention relates to photographic equipment and more particularly relates to camera assembly methods and apparatus and cameras produced using such methods and apparatus.

BACKGROUND OF THE INVENTION

Single use cameras are commonly sold preloaded with a cartridge of film. In order to reduce complexity and costs, a rewind mechanism is omitted from the camera. Instead, the film is prewound and during use is advanced back into the film canister. A number of approaches have been followed in loading and prewinding film cartridges for single use cameras. In some approaches, such as one taught in U.S. Pat. No. 4,972,649; film is prewound into a roll outside the camera body and then loaded. A shortcoming of these approaches is that the film roll must be handled after it is formed. This presents a risk of film damage and may add complexity to necessary equipment. In some other approaches, also taught in U.S. Pat. No. 4,972,649; the cartridge is loaded, the camera is light-tightly closed, and the film is then prewound. In still other approaches, such as taught by U.S. Pat. No. 5,311,231; the cartridge is loaded and then the rear opening of the camera body is closed and the film is prewound through a bottom opening, which is later sealed. The latter two approaches have the shortcoming that film guiding is provided primarily by the camera body, rather than loading apparatus. This places constraints on the camera body in terms of required tolerances and the like and may, in addition, slow throughput speeds. Still another approach is taught by Japanese Kokai 6-295022, European Patent Application No. 0743546-A, and Japanese Kokai 8-171180. In this approach, the film is wound onto a second spool, rather than being wound into a film roll. The back of the camera is not mandatory for guiding the film, since the second spool tends to restrain the film.

It is known to use vacuum and/or compressed gas to direct and wind webs. U.S. Pat. No. 4,228,579 teaches the use of a vacuum mandrel for winding a film roll from bulk outside a cassette. Vacuum through slots in the mandrel is used to cinch protective tape (tape backed film). After the roll is formed it is loaded in the cassette and compressed air is used to drive the film off the mandrel. The film roll unfurls against the walls of the housing. U.S. Pat. No. 4,520,970 teaches a tape drive having a take-up hub with vacuum ports. A air jet is disposed to drive the tape toward the take-up hub. U.S. Pat. Nos. 4,794,475 and 3,795,371 teach other tape drives having air jets. U.S. Pat. No. 3,527,424 teaches a winding apparatus in which a sheet of metal or other material is wound onto a vacuum mandrel. Jets of pressurized fluid drive the sheet material toward the mandrel.

U.S. Pat. No. 2,781,983 and U.S. Pat. No. 4,418,874 teach web winding apparatus in which vibration is used to reduce friction during scroll formation.

Japanese Kokai 9-43777A, filed Jul. 28, 1995; and Japanese Kokai 9-43778A, filed Jul. 28, 1995 disclose methods for prewinding film from a cartridge within a fixture, using compressed air. The fill roll and cartridge are then transferred to a single use camera.

It would thus be desirable to provide camera assembly methods and apparatus and resulting cameras, in which a spoolless film roll is wound, from a cartridge, in the frame of a camera using compressed gas.

SUMMARY OF THE INVENTION

The invention is defined by the claims. The invention, in its broader aspects, provides a method and apparatus for loading photographic film in a camera and cameras so produced. In the method, a camera frame assembly is supplied. The camera frame assembly includes a camera frame having a cartridge chamber, a scroll chamber, and an intermediate section disposed between the two chambers. The scroll chamber has a wall that defines a substantially cylindrical, empty film space. A film cartridge having a filmstrip, is placed in the cartridge chamber. The filmstrip is advanced from the cartridge to the scroll chamber. A major portion of the filmstrip is coiled into a scroll within the film space. During the coiling, the scroll is supported within the film space on a fluid bearing between the scroll chamber wall and the filmstrip.

It is an advantageous effect of at least some of the embodiments of the invention that camera assembly methods and apparatus and resulting cameras are provided, in which a spoolless film roll is wound, from a cartridge, in the frame of a camera using compressed gas.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
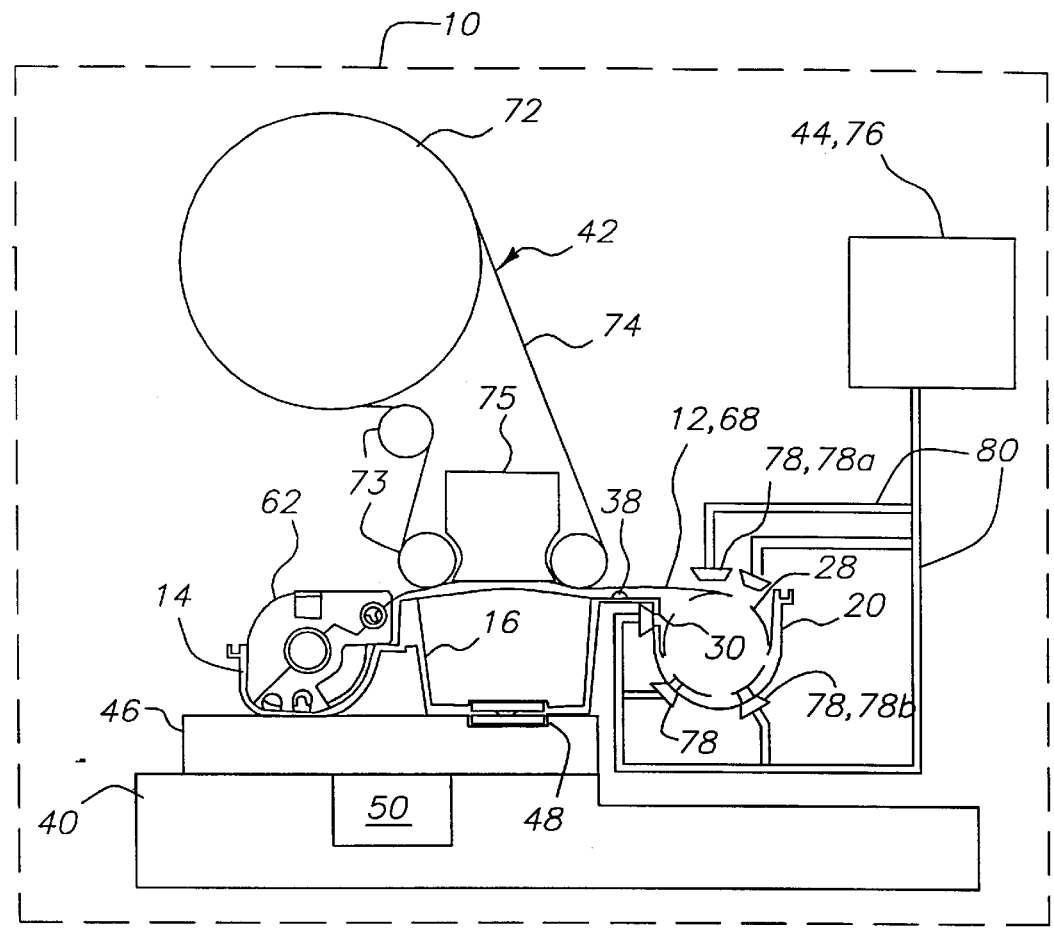
FIG. 1 is a semi-diagrammatical side cross-sectional view of an embodiment of the apparatus of the invention and camera assembly of the invention.
Figure 2:
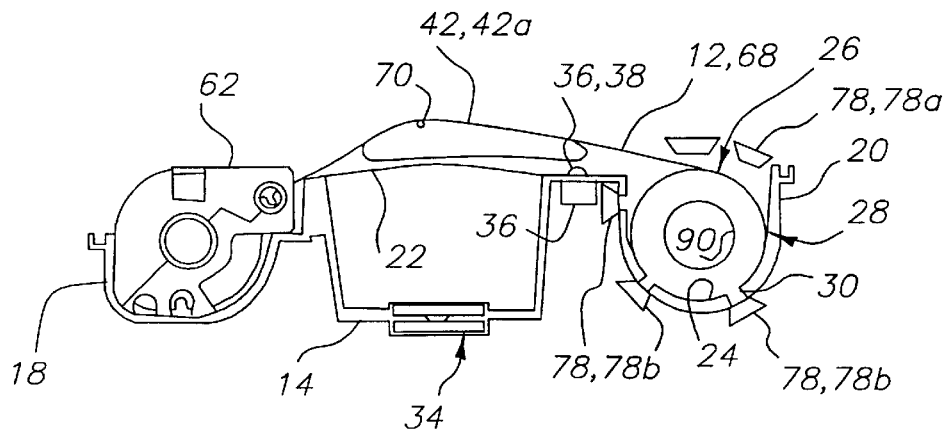
FIG. 2 is a semi-diagrammatical perspective view of the camera assembly of FIG. 1 in another embodiment of the apparatus of the invention. For clarity, the receiver, pressurized gas supply, and gas lines are not shown.
Figure 3:
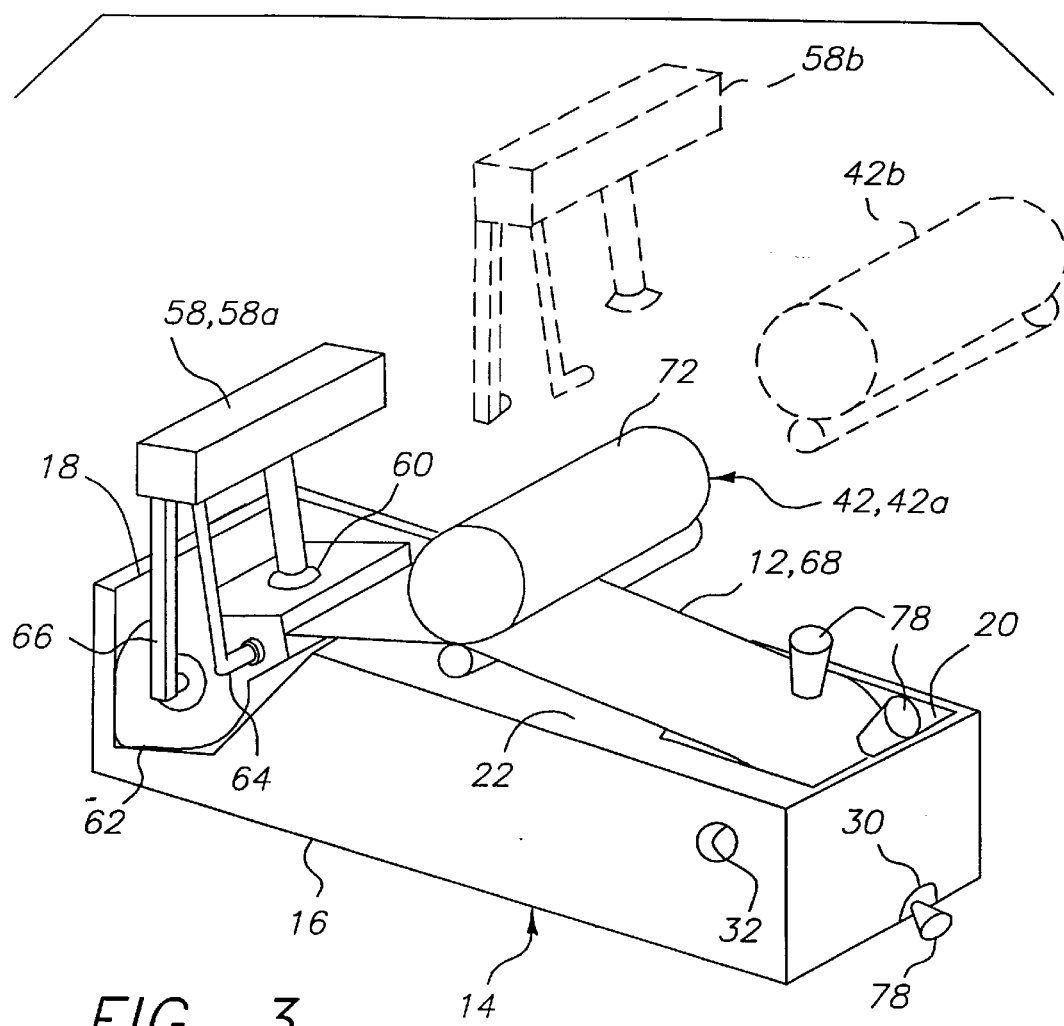
FIG. 3 is a semi-diagrammatical perspective view of still another embodiment of the apparatus and camera assembly of the invention. For clarity, the receiver, pressurized gas supply, and gas lines are not shown and the bottom of the cartridge chamber has been deleted. The film bridge and cartridge mover are shown in a use position in solid lines and in a rest position in dashed lines.

Referring initially to FIGS. 1–3, the apparatus 10 of the invention is used, in a darkroom, to prewind a filmstrip 12 in a camera frame assembly 14, that is, a camera or incomplete camera subunit. The camera frame assembly 14 includes a frame 16 having a cartridge chamber 18, a scroll chamber 20, and an intermediate section or exposure frame 22 between the chambers 18,20. The scroll chamber 20 has a concave wall 24 that defines an upwardly facing throat or entry opening 26 and a substantially cylindrical, empty film space 28. The scroll chamber 20, in some embodiments of the invention includes one or more fluid ports 30 and one or more exhaust passages 32, as discussed in detail below.

The camera frame assembly 14 can also include other camera components which have been previously installed on the camera frame 16. For example, the camera frame assembly 14 can include an exposure system 34, including one or more sub-components such as a baffle, a lens system, and a shutter. It is currently preferred, for reasons of ease of later assembly, that the camera frame assembly 14 include a camera film drive (illustrated diagrammatically in FIG. 2 as a box 36). Some camera film drives 36 have a film engagement member 38 (indicated diagrammatically in FIG. 1 by a semicircle) which adjoins, and in some cases is partly disposed in the intermediate section 22. The film engagement member 38 engages film perforations (not illustrated) for film metering or both film metering and film transport 72. A variety of such camera film drives 36 are well known to those of skill in the art. In such drives, the film engagement member can be a linearly reciprocated pawl; however, a sprocket is more commonly used as the film engagement member. In many film drives for type 135 (35 mm.) film, the sprocket is a continuously toothed wheel. The sprocket rotates with film movement; but, at all times, part of the sprocket extends rearward from the intermediate section. In some film drives for APS film, for example, in Japanese Kokai 7-5526, filed Jun. 14, 1993, the film engagement member is a skater or incompletely toothed sprocket in which an oval wheel has a pair of teeth at each end of the long axis and a toothless portion at each end of the short axis.

The apparatus 10 includes a receiver 40, an optional film bridge 42, and a pressurized gas source 44. The receiver 40 supports the camera frame assembly 14 in a predetermined loading position or series of positions relative to the film bridge 42 and pressurized gas source 44. The receiver 40 has a predetermined relationship to other components and thus, during assembly, defines a predetermined relative location or site for each of the chambers, intermediate section, and film space. The receiver 40 can accept the camera frame assembly 14 directly or can be adapted to accept a pallet or nest 46 or the like. In that case, the camera frame assembly 14 is held in a predetermined relation to the pallet 46, which in turn in held in a predetermined loading orientation by the receiver 40. Indexing features 48 can be provided on the pallet 46 to permit the camera frame assembly 14 and the receiver 40 to be readily aligned.

Figure 12:
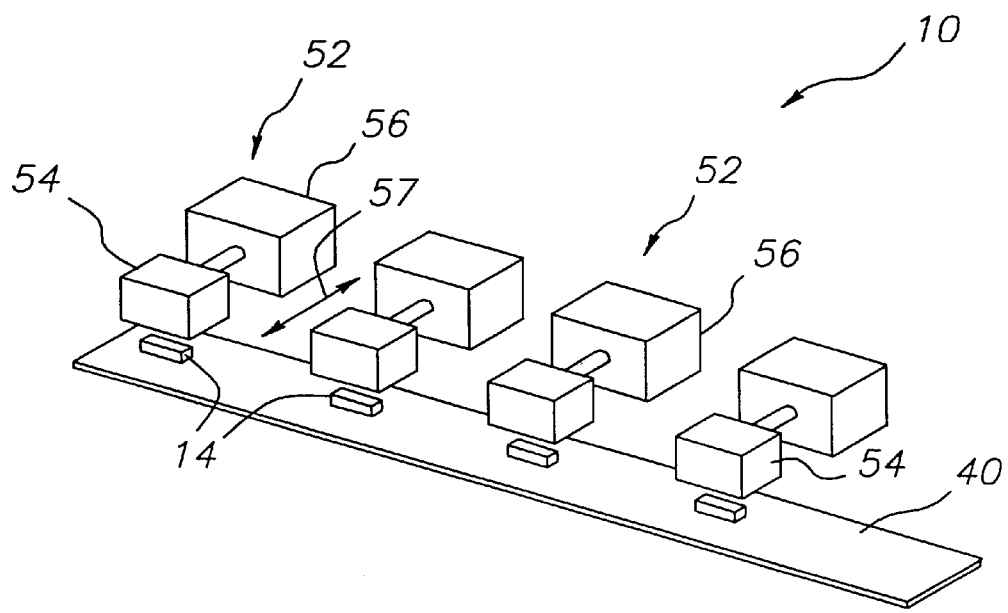
FIG. 12 is a semi-diagrammatical perspective view of still another embodiment of the apparatus of the invention.

The receiver 40 can have a variety of features for supporting automated assembly operations. For example, the receiver 40 can include a movement system or positioner, indicated schematically in FIG. 1 by item 50, for moving a camera frame assembly 14 between the apparatus 10 of the invention and one or more other assembly stations or between stations 52 having different components 54 of the apparatus 10 of the invention. For example, in FIG. 1, the positioner 50 can be a conveyor or track for moving the camera frame assembly 14 in directions perpendicular to the plane of the figure. The apparatus components 54 can each include a retraction-extension mechanism 56 to allow the component 52 to extend to an active position for use and to retract to a store position clear of the movement system between actuations. (Directions of movement for one component 54 are indicated in FIG. 12, by double-headed arrow 57.) As a matter of convenience, the following discussion generally treats the receiver 40 as being static relative to other components of the apparatus 10 of the invention.

Referring now to FIG. 3, the apparatus 10 can include a cartridge mover 58 for positioning the cartridge in the cartridge chamber 18 site. The cartridge mover 58 can be simply a pick and place mechanism or can provide additional functions. In the embodiment of the invention shown in FIG. 3, the cartridge mover 58 has a vacuum gripper 60 which allows the cartridge mover 58 to position the cartridge 62 in the site of the cartridge chamber 18. The vacuum gripper 60 or a holddown (not shown) can be used to retain the cartridge 62 in the cartridge chamber 18 during film winding, if the camera frame assembly 14 lacks features to prevent oscillation or other movement. In this embodiment, the cartridge mover 58 also supports an active light lock opener 64 and a spool rotator 66. The active light lock opener 64 pivots to open the active light lock of a suitable film cartridge, such as an Advanced Photo System™ (APS™) cartridge, prior to placement of the cartridge in the cartridge chamber site. This allows the camera frame assembly 14 to include a detent (not shown) which retains the active light lock in the open position prior to cartridge removal for processing. The spool rotator 66 engages the spool of the APS cartridge and rotates the spool to thrust film from the cartridge 62.

The apparatus 10 defines a film path 68 extending from the site of the cartridge chamber 18 to the site of the scroll chamber 20. (In FIGS. 1–3, the film path 68 is occupied by the filmstrip 12; and the film bridge 42 is disposed over the intermediate section 22 and defines parts of the film path 68.) The apparatus 10 has a film transport 72, disposed in operative relation to the film path 68, to propel the filmstrip 12 along the film path 68. The film transport can use a driven roller, or belt, or other conventional film transport device (not separately illustrated) to move the film along the film path. With a thrust-type film cartridge, a spool rotator, like that previously discussed, can also be utilized.

In embodiments of the invention in which the camera film drive 36 has a film engagement member 38, such as a conventional sprocket, that continually extends into the intermediate section 22, it is preferred that the film path 68 is spaced apart from the intermediate section site by use of a film bridge 42, since this separates the filmstrip 12 from the camera film drive 36, which thus does not need to be disabled during scroll formation. In some other embodiments, the film engagement member 38 of the camera film drive 36, is a skater or the like and can be positioned so as to not extend into the intermediate section 22 during film winding. In these embodiments the use of a film bridge 42 is not mandatory, since film winding through the intermediate section 22 will pass freely over the film engagement member 38. A frame assembly having film retention fingers can be used. Such a frame assembly is disclosed in U.S. patent application Ser. No. 08/796,155, entitled "ONE-TIME-USE CAMERA HAVING MAIN BODY PART AND INSERTABLE LIGHT BAFFLE WITH FILM HOLDERS TO FACILITATE CAMERA ASSEMBLY", filed Feb. 6, 1997, by Douglas H. Pearson, which is hereby incorporated herein by reference. The film retention fingers define and guide the filmstrip along part of the film path: a film entrance leading into the scroll chamber.

The film bridge 42 can take a variety of forms. For example, the film bridge 42 can be a turtleback 42a as shown in FIG. 2. It is preferred that the turtleback 42a present minimal friction to the filmstrip 12. The turtleback can provide one or more friction reducing features (indicated by item 70 in FIG. 2); such as holes and a pressurized gas connection to create an air cushion or rotary bearings.

It is highly preferred that the film bridge 42 include the film transport 72 to propel the filmstrip 12 across the film bridge 42 to the scroll chamber 20. Examples of film bridges 42 that include a film transport 72 include a capstan drive, as shown in FIG. 3; a vacuum shuttle, such as that disclosed in U.S. Pat. No. 5,125,630; and an endless belt mechanism, as shown in FIG. 1. The endless belt 74 can be disposed between the filmstrip 12 and the intermediate section 22 of the camera frame assembly 14 or, as shown in FIG. 1 can overlie the filmstrip 12. In the latter case, the endless belt 74 has holes (not shown) and includes a vacuum-compressed gas unit 75 which provides a vacuum to pull the filmstrip 12 against the belt 74 for transport, and directs compressed gas against the filmstrip 12, or uses the geometry of the belt 74, to release the filmstrip 12 from the belt 74. The mechanism 42 includes a belt drive 72 and idlers 73 which position and tension the belt 74. The film bridge 42 can be permanently positioned relative to the receiver 40 or a positioner 50 can be provided for moving the film bridge 42 relative to the receiver 40, between a use position over the intermediate section 22 site and a rest position spaced apart from the use position. The cartridge mover 58 can be repositioned in the same manner; between active and rest positions 58a,42a and 58b,42b, respectively; as shown in FIG. 3.

The pressurized gas source 44 includes a supply of pressurized gas 76 and one or more nozzles 78 connected to the supply by connectors or gas lines 80. The gas used is not critical; however, materials which could adversely effect film image quality are undesirable. Air at a humidity and temperature suitable for the film used, is convenient and economical.

Nozzles 78 and connectors 80 can be mounted so as to move between a use position and a rest position in the same manner as the film bridge 42 and cartridge mover 58, either with the other components or independently. The nozzles 78 are each positioned so as to deliver a stream of pressurized gas that impinges against the filmstrip 12 within the scroll chamber 20, in combination with the streams from any other nozzles 78, forms a gas bearing between the filmstrip 12 and the camera frame 16.

The apparatus 10 has one or more nozzles 78. In the embodiments shown in the figures, the apparatus has one or more non-frame nozzles 78a and can also have one or more frame nozzles 78b. The non-frame nozzles 78a are displaced from of the frame 16 during use and deliver a stream of pressurized gas directly to the filmstrip 12 through the throat 26 of the scroll chamber 20. The frame nozzles 78b contact or closely adjoin the frame 16 during use and deliver pressurized gas into the scroll chamber 20 through fluid inlets or passages 30, which communicate with the scroll chamber 20 below the throat 26.

Figure 7A:
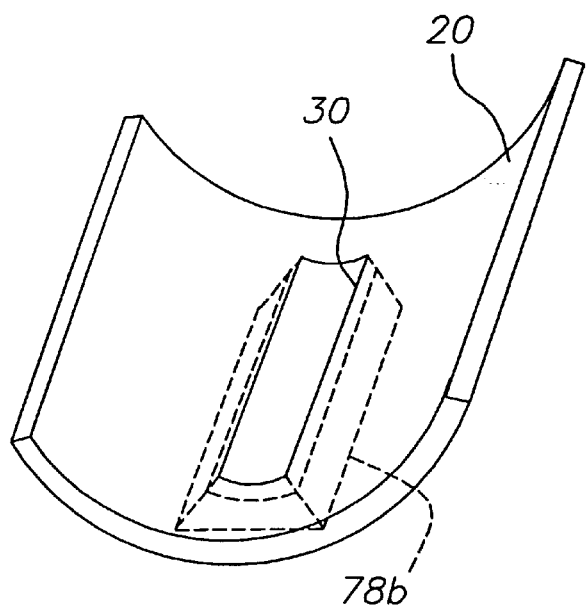
FIGS. 7A and 7B are partial perspective views of scroll chambers and nozzles of alternative embodiments of the apparatus of the invention.
Figure 7B:
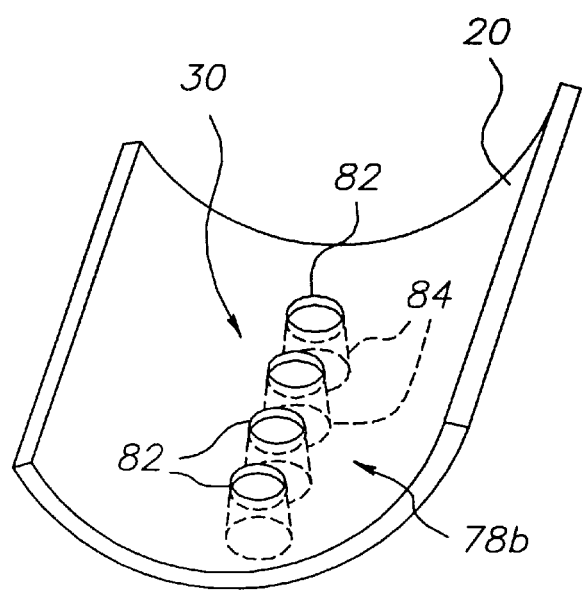

The specific configurations of the nozzles 78 and fluid inlets 30 are not critical. Fluid inlets 30 can be shaped to act as extensions of respective nozzles 78, but can have simpler or more complex shapes than their respective nozzles 78. FIGS. 7A–7B illustrate two convenient configurations for nozzles 78 and associated fluid inlets 30. FIG. 7A shows a prismatic one-piece nozzle 78 and matching fluid inlet 30. FIG. 7B shows a multiple-piece nozzle 78 and matching multiple-opening fluid inlet 30. Each of the nozzle subunits 84 is conical and fits in a matching inlet subunit 82. Either of the nozzles of FIGS. 7A and 7B is a desirable substitute for the simplified nozzles shown in the other figures.

Nozzle shape is one of the parameters that can be varied to optimize scroll formation for a particular camera frame assembly and filmstrip. Other parameters that can be varied include film transport speed, gas pressures, and nozzle and fluid inlet numbers and placements. For example, in order to scroll relatively stiff filmstrips or produce relatively smaller diameter scrolls, individual nozzles can be replaced by rows of nozzles. The gas flow through the nozzles can be continuous or pulsed and can be laminar or turbulent. Gas flow can be provided in a different manner for different nozzles. With turbulent flow, DeLaval nozzles can be employed when the ratio of the pressure of the delivered gas and the ambient pressure exceed the critical pressure ratio for the fluid. Turbulent flow has the advantage that during formation of the initial turns, as gas voticies develop and collapse, the filmstrip becomes unstable and flutters. This reduces resistance to initial scroll formation. A similar effect can be provided for laminar flow by vibrating the camera frame assembly. The vibrator (not separately illustrated) can be included as part of the receiver.

The placement and number of nozzles 78 in the apparatus of the invention, can be varied. It is highly desirable; however, that the fluid inlets 30 extend into the scroll chamber 20 in no more than four directions. It is also highly desirable that the number of fluid inlets 30, be limited to one per quadrant of the scroll chamber 20 or less, for a total of four or less. The reasons relate to cost and ease of manufacturing. The frame 16 is desirably made in a molding process. Holes in a part to be molded, increase complexity add generally increase cost. Similarly, holes angled in different directions require multiple-piece molds, with parts movable in different directions to clear differently oriented holes. This adds more complexity and cost. These costs are critical for single use and other simple cameras. It has further been determined that frame nozzles extending into the scroll chamber in more than four directions or the use of more than four frame nozzles, in addition to being undesirable, is also unnecessary to the practice of the invention.

Figure 4B:
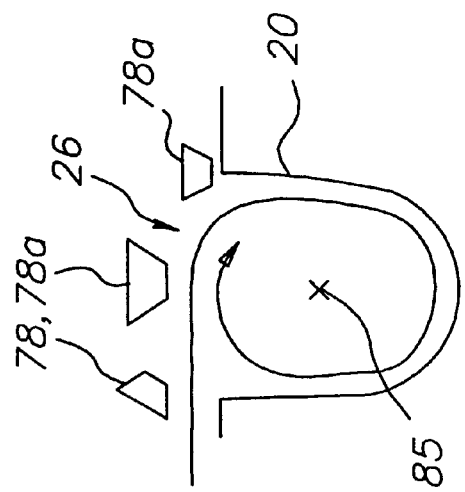
FIGS. 4A–4C are diagrammatical views of the scroll chamber and nozzles in different embodiments of the invention.
Figure 4C:
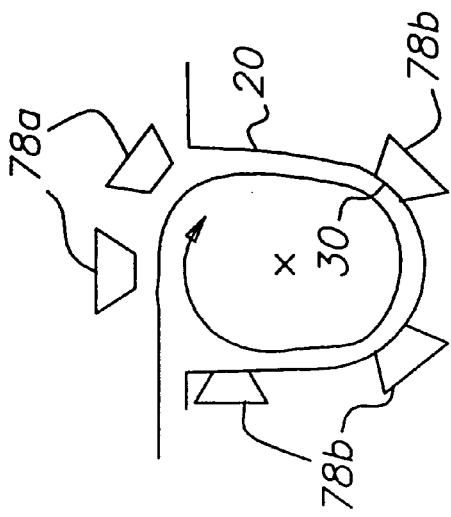
Figure 4A:
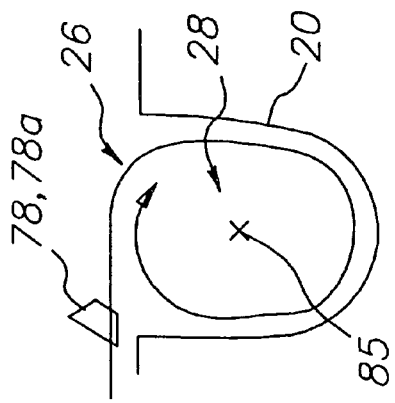

The nozzles 78 can be provided in number of different arrangements. Referring now to FIGS. 4A–4B, the nozzles 78 can be limited to one or more non-frame nozzles 78a disposed above and facing the throat 26 of the scroll chamber 20. This approach is not preferred, because the number of turns of scroll that can dependably be wound is relatively low. The number of turns is increased by the use of frame nozzles 78b and a camera assembly 14a having matching fluid inlets 30 in the scroll chamber 20. Referring now to FIGS. 1–3 and 4C, in an alternative embodiment of the camera assembly 14a of the invention, the frame 16 has a series of fluid inlets 30 in the scroll chamber 20 and the number of turns of scroll can be further increased.

In particular embodiments of the invention, nozzles 78 face either substantially tangential or substantially radial to the film space 28 or both. In the embodiment illustrated in FIG. 4A, a first non-frame nozzle 78a delivers a gas stream in a direction almost parallel to the throat 26 of the scroll chamber 20 and substantially tangent to the film space 28. In the embodiment illustrated in FIG. 4B, the first non-frame nozzle 78a is in the same place, but there are two additional nozzles 78a. A second non-frame nozzle 78a delivers a gas stream in another direction, also substantially tangent to the film space 28, but substantially perpendicular to the throat 26 of the film chamber. A third non-frame nozzle 78a delivers a gas stream in a direction substantially radial to the film space 28. (The location of the axis 85 of the film space 28 is indicated by an "X" in FIGS. 4A–4C.) In the embodiment of FIG. 4C, there are two non-frame nozzles 78a and each is disposed to deliver a stream or jet of gas in a direction substantially radial to the film space 28. There are three frame nozzles 78b. Each frame nozzle 78b is also substantially radial to the film space 28.

Figure 5:
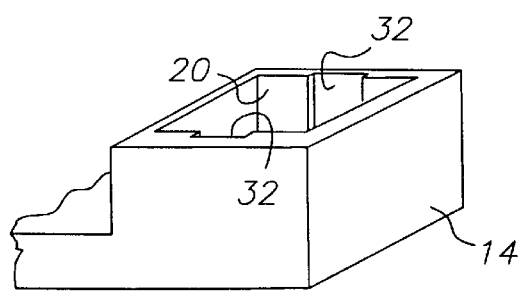
FIG. 5 is a partial perspective view of another embodiment of the camera assembly of the invention.
Figure 6:
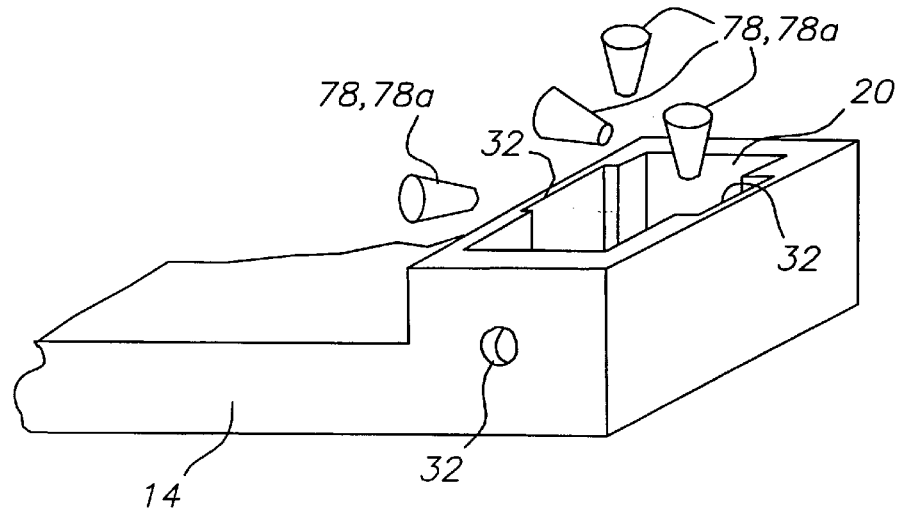
FIG. 6 is a partial perspective view of yet another embodiment of the camera assembly of the invention and the nozzles of another embodiment of the apparatus of the invention.

In the camera assemblies 14a of the invention, exhaust gas exits the scroll chamber 20 through one of more exhaust passages 32. FIG. 5 illustrates a scroll chamber 20 having exhaust passages 32 extending axially outward at each end and circumferential exhaust passages 32. FIG. 6 illustrates a scroll chamber 20 having upwardly extending exhaust passages 32 at opposed ends of the cylindrical film space 28.

The method of the invention is particularly suitable for prewinding film in one time use cameras; but is also suitable for prewinding reusable cameras marketed ready for use, that is, with a preloaded, prewound film cartridge. In the method of the invention, a film cartridge is loaded into the cartridge chamber 18 of the camera frame assembly 14. The filmstrip 12 remains attached at one end to a spool in the cartridge. After scrolling (discussed in more detail below), the filmstrip 12 extends from the cartridge, across the intermediate section 22 to the scroll chamber 20, and the major portion of the filmstrip 12 is a scroll 90 resting in the scroll chamber 20.

Figure 8A:
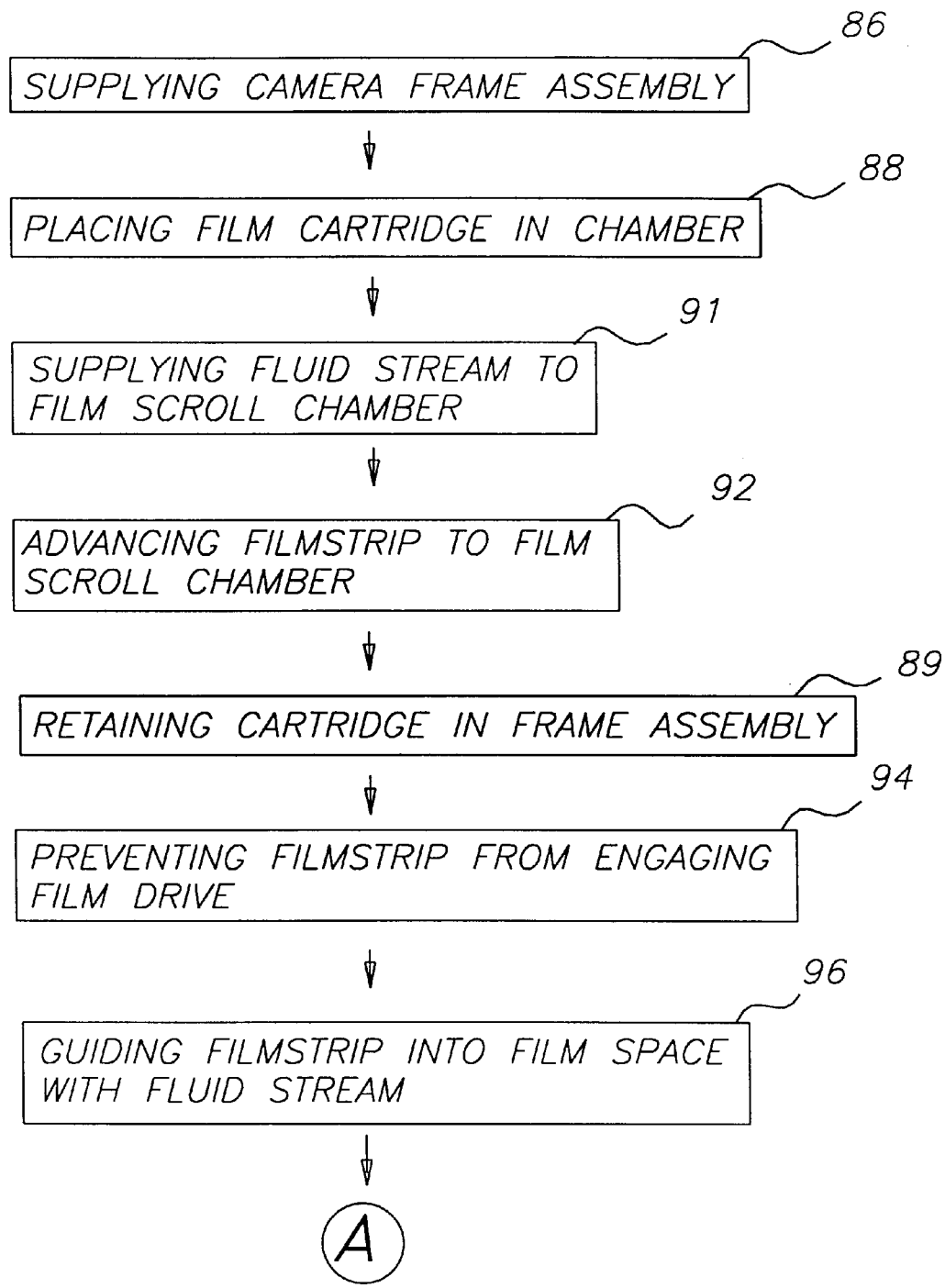
FIGS. 8A–8B are a flow chart of an embodiment of the method of the invention.
Figure 8B:
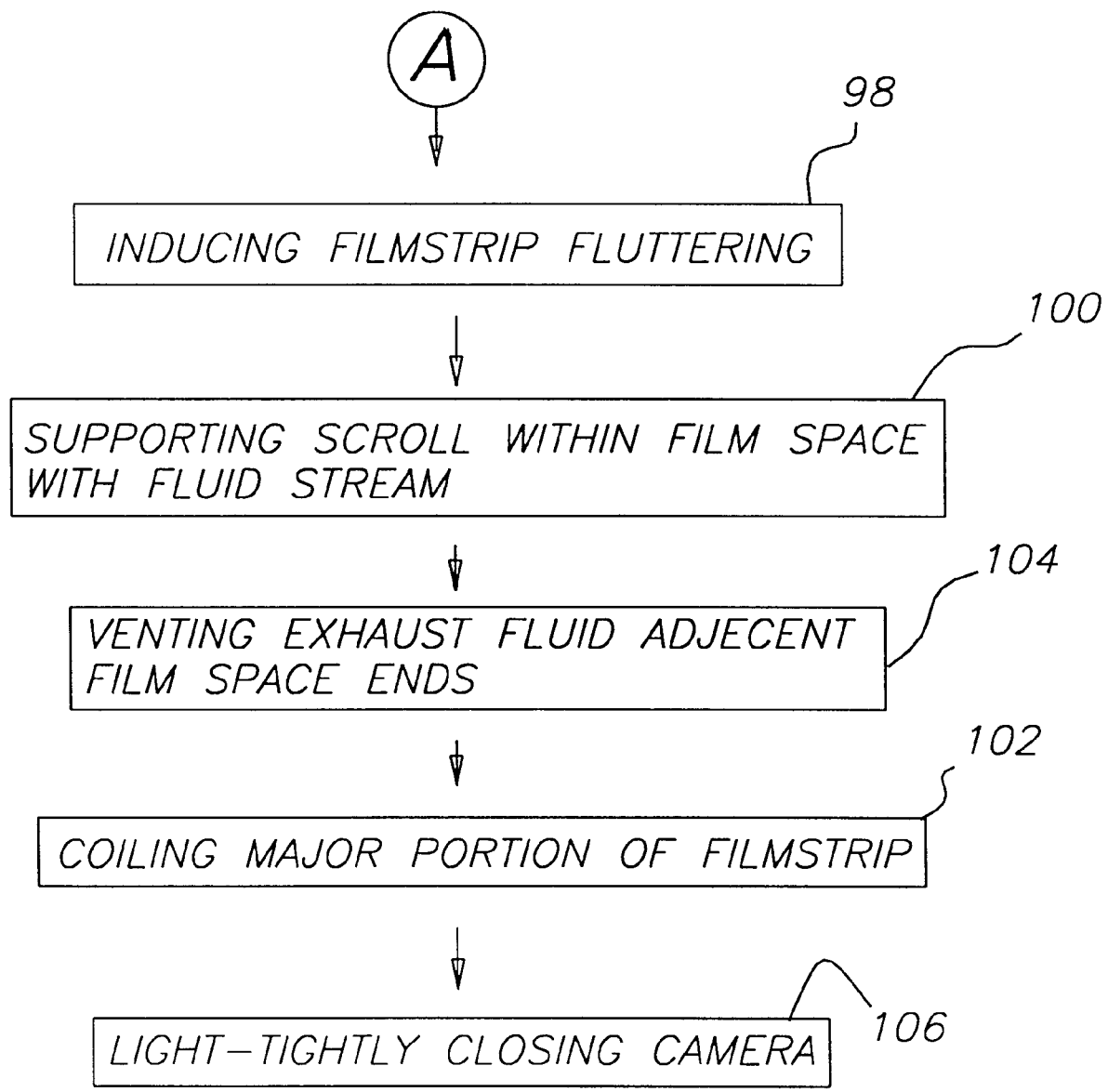

Referring now to FIGS. 8A–8B, a camera frame assembly 14 is first supplied (86). As noted above, the camera frame assembly 14 can be premounted on a pallet 46. A film cartridge 62 is then gripped and placed (88) in the cartridge chamber 18 of the camera frame assembly 14. The cartridge mover 58 can simply place a film cartridge 62 in the cartridge chamber 18 or can pick up a cartridge 62 from a supply (not shown), move the cartridge 62 to the cartridge chamber 18, and then continue to grip or otherwise retain (89) the cartridge 62 in position during film winding. The cartridge is released after film winding is completed. In that embodiment, an active light lock of the cartridge is opened prior to placement of the cartridge in the cartridge chamber.

Next, the film scrolling apparatus 10 is moved into place relative to the camera frame assembly or is otherwise placed in an active condition relative to the camera frame assembly 14. Depending upon the film drive of the camera frame assembly, as discussed above, a film bridge 42 can be positioned over the intermediate section 22 of the frame 16. Nozzles 78, connected to the pressurized gas supply, are connected to the scroll chamber 20 or positioned, as previously discussed, adjoining the scroll chamber 20 and gas streams are supplied to the film scroll chamber (91).

The filmstrip 12 is then advanced (92) from the cartridge 62 to the scroll chamber 20 along a film path 68. In a particular embodiment of the invention, the filmstrip 12 is thrust out of the cartridge to the film bridge 42 and is then transported by the film bridge 42 to the scroll chamber 20. In that embodiment, the film path 68 is spaced apart from the camera film drive 36 and thus, during film advancing, the filmstrip 12 is prevented (94) from engaging the film drive.

As the filmstrip 12 is advanced, one or more gas streams contact the filmstrip 12. In a particular embodiment of the invention, one or more of the gas streams impinges against the filmstrip 12 and deflect and guide (96) the filmstrip 12 toward the film space 28 in the film chamber. In a particular embodiment of the invention, the initial portion or leader of the filmstrip 12 is then induced to flutter (98), by vibrating the camera frame 16 or inducing turbulent gas flow (i.e. vortex shedding) around the filmstrip 12, to aid in the formation of an initial turn of the scroll.

The major portion of the filmstrip 12 then coils (102) within the film space 28, into a scroll. During the coiling, the scrolled portion of the filmstrip 12 is supported (100) within said film space 28 on a fluid bearing between the scroll chamber 20 wall and the filmstrip 12. The fluid bearing is formed by jetting pressurized gas into the scroll chamber 20, on a continuous or pulsed basis, peripheral to the film space 28. The air streams maintain the fluid bearing between the filmstrip 12 and the wall of the film chamber during all or part of the scrolling of the filmstrip 12. As discussed above, in different embodiment of the invention, gas is jetted into the scroll chamber 20 tangential to the film space 28 or radial to the film space 28 or both.

During scroll formation, exhaust gas is vented (104) through exhaust passages 32 outside the film space 28. In particular embodiments of the invention, the exhaust gas is vented in directions axial to the film space 28 through opposed exhaust passages 32.

Figure 9:
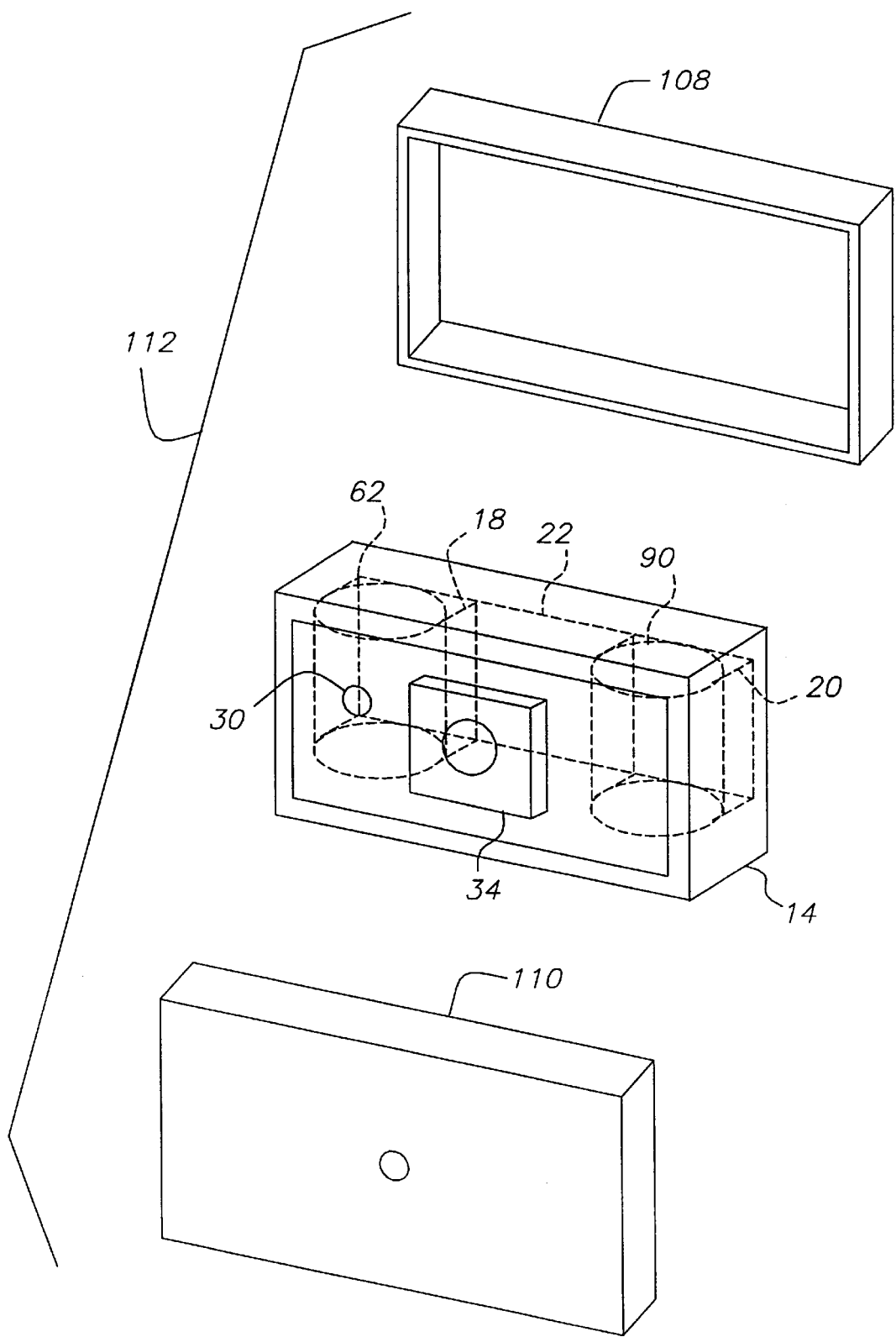
FIG. 9 is an exploded perspective view of an embodiment of the camera of the invention.
Figure 11:
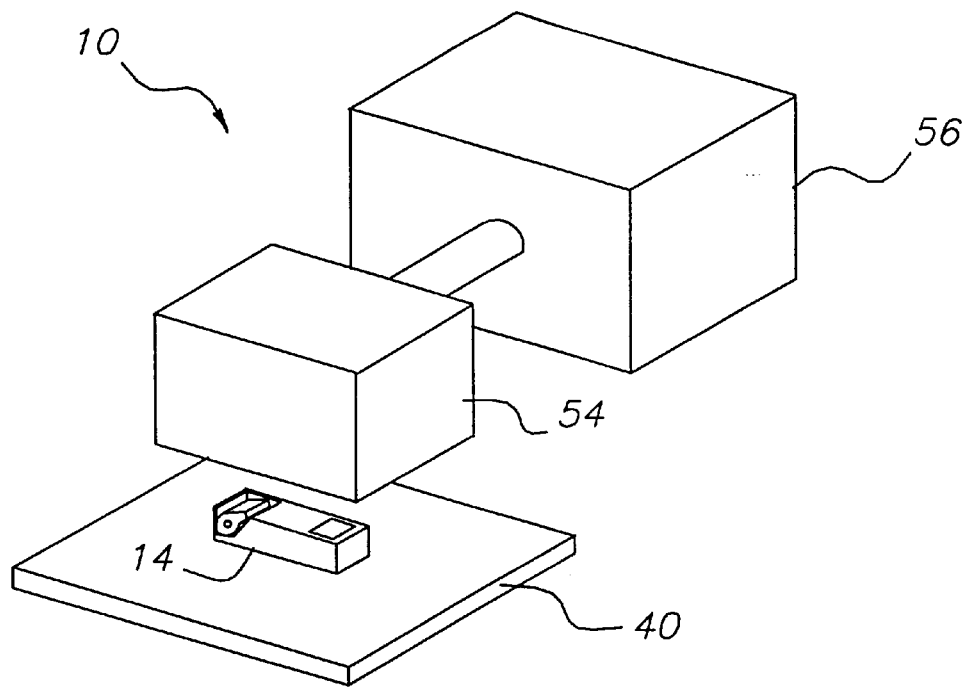
FIG. 11 is a semi-diagrammatical perspective view of another embodiment of the apparatus of the invention.

The camera frame assembly 14 is next displaced relative to the film bridge 42, and slack in the filmstrip 12 is taken up by scrolling a final portion of the filmstrip 12 or retracting that filmstrip 12 portion back into the cartridge. Nozzles 78 and other components of the apparatus 10 of the invention are withdrawn, relative to the camera frame assembly 14, which is then moved along for further processing. In that further processing, the chambers 18,20 and intermediate section 22 of the camera frame assembly 14 including the fluid inlets 30, are light-tightly closed (106). Referring now to FIG. 9, in a particular embodiment of the invention, this is accomplished by placing light-tight rear cover 108 over the chambers 18,20 and intermediate section 22 and a light-tight front cover 110 over the camera frame assembly 14 so as to block light from entering through the fluid inlets 30. The resulting camera assembly can be a completed camera or can be completed in further assembly operations, to provide the camera 112 of the invention. In addition to the features already discussed, including a film cartridge 62 and film scroll 90, the camera 112 of the invention can also include other conventional camera features well known to those of skill in the art.

The following Examples are presented to further illustrate and elucidate the invention.

EXAMPLES 1–21

Figure 10:
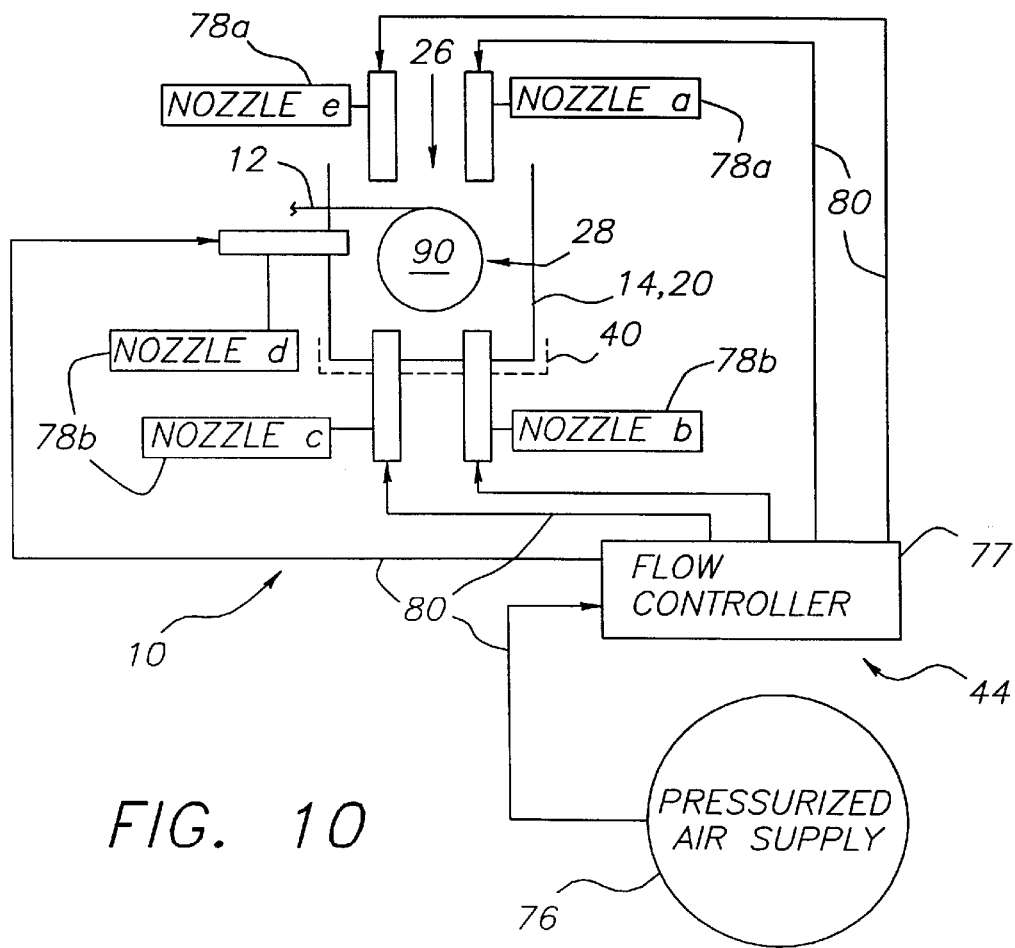
FIG. 10 is a diagrammatical view of the embodiment of the apparatus of the invention used in the Examples.

A camera frame assembly generally like that shown in FIG. 3 was seated in the receiver 40 of the embodiment of the apparatus 10 of the invention illustrated schematically in FIG. 10 and generally as shown in FIG. 3. The scroll chamber 20 of the camera frame assembly 14 had three fluid inlets 30 in the scroll chamber 20. An APS film cartridge 62 was placed in the cartridge chamber 18. The film cartridge was retained in place (not shown) and the filmstrip 12 was thrust from the cartridge 62 to the capstan drive 72 of a film bridge 42. The filmstrip 12 was then advanced along the film path 68 to the throat 26 of the scroll chamber 20. Two upper nozzles 78a were positioned over the scroll chamber 20. Three lower nozzles 78b were connected to respective fluid inlets 30 of the scroll chamber 20. Nozzles a, b, c, and e were each disposed substantially tangent to the film space 28. Nozzles a and b faced upward and downward, respectively, at the right margin of the film space 28. Nozzles c and e faced upward and downward, respectively, at the left margin of the film space 28. Nozzle d directed air stream radially inward from the left margin of the film space 28. Compressed air was supplied from a pressurized air supply, through a flow controller 77 to the nozzles 78a,78b. Compressed air was supplied to each of the nozzles 78a,78b starting prior to the start of film transport and continuing for each nozzle 78a,78b until the filmstrip 12 reached the number of turns indicated for that nozzle in Table 1. The force of the air stream from each nozzle was substantially the same and was calculated to be about 2.2 ounces as follows. A continuous air flow was provided to nozzles a and e. A pulsed air flow was provided to nozzles b, c, and d. In each example, the relative amount of film transported is indicated by the number of degrees of rotation of the cartridge spool. Flutter was induced during initial scrolling in Examples 5–21 by increasing air flow to cause vortex shedding.

TABLE 1

| | Rotation of cartridge | Nozzle | | | | |
|---|---|---|---|---|---|---|
| Ex. | spool (degrees) | a | b | c | d | e |
| 1 | 360 | 3 | none | none | none | 5 |
| 2 | 720 | none | none | none | 1 | 7 |
| 3 | 360 | 3.5 | none | none | none | 6 |
| 4 | 720 | none | none | none | none | 7.5 |
| 5 | 180 | none | none | none | none | 6 |
| 6 | 360 | 5 | none | none | none | 6 |
| 7 | 720 | 6 | none | none | none | 6 |
| 8 | 1080 | 6 | none | none | none | 6 |
| 9 | 1440 | 6 | none | none | none | 6 |
| 10 | 1800 | 7.5 | none | none | none | 6 |
| 11 | 2160 | 7.5 | none | none | none | 6 |
| 12 | 2520 | 7.5 | none | none | none | 6 |
| 13 | 2880 | 7.5 | 4 | 4 | none | 6 |
| 14 | 3240 | 7.5 | 4 | 4 | none | 6 |
| 15 | 3600 | 7.5 | 4 | 4 | none | 6 |
| 16 | 3960 | 7.5 | 4 | 4 | none | 6 |
| 17 | 4320 | 7.5 | 4 | 4 | none | 6 |
| 18 | 4680 | 7.5 | 4 | 4 | none | 6 |
| 19 | 5040 | 7.5 | 4 | 4 | none | 6 |
| 20 | 5400 | 7.5 | 4 | 4 | none | 6 |
| 21 | 5760 | 7.5 | 4 | 4 | none | 6 |

The invention has been described in detail with particular reference to certain preferred embodiments thereof, but it will be understood that variations and modifications can be effected within the spirit and scope of the invention.

PARTS LIST apparatus 10
filmstrip 12
camera frame assembly 14
frame 16
cartridge chamber 18
scroll chamber 20
intermediate section 22
concave wall 24
throat 26
film space 28
fluid inlets 30
exhaust passages 32
exposure system 34
camera film drive 36
film engagement member 38
receiver 40
film bridge 42
turtleback 42a
pressurized gas source 44
pallet or nest 46
Indexing features 48
positioner 50
stations 52
components 54
retraction-extension mechanism 56
double-headed arrow 57
cartridge mover 58
vacuum gripper 60
cartridge 62
active light lock opener 64
spool rotator 66
film path 68
friction reducing features 70
film transport 72
idlers 73
endless belt 74
vacuum-compressed gas unit 75
supply of pressurized gas 76
flow controller 77
nozzles 78
non-frame nozzles 78a
frame nozzles 78b
connectors or gas lines 80
inlet subunit 82
nozzle subunits 84
film space axis 85
camera frame assembly is supplied (86)
film cartridge is placed into the cartridge chamber (88)
retaining the cartridge in position (89)
scroll 90
supplying gas streams to the film scroll chamber (91)
advancing filmstrip (92)
preventing engagement of the film drive (94)
guiding filmstrip toward film space (96)
inducing filmstrip to flutter (98)
supporting scroll within film space with fluid stream (100)
coiling scroll (102)
venting exhaust (104)
light-tightly closing (106)
light-tight rear cover 108
light-tight front cover 110
camera 112

What is claimed is:

1. A method for loading photographic film in a camera, comprising the steps of:
 supplying a camera frame assembly including a camera frame having a cartridge chamber, a scroll chamber, and an intermediate section disposed between said chambers, said scroll chamber having a wall defining a substantially cylindrical, empty film space;
 placing a film cartridge in said cartridge chamber, said film cartridge having a filmstrip;
 advancing said filmstrip from the cartridge to said scroll chamber;

coiling a major portion of said filmstrip into a scroll within said film space; and during said coiling, supporting said scroll within said film space on a fluid bearing between said scroll chamber wall and said filmstrip.

2. The method of claim 1 wherein said camera frame assembly includes a camera film drive having a film engagement member adjoining said intermediate section and said method further comprises preventing said filmstrip from engaging said film engagement member during said advancing.

3. The method of claim 1 further comprising initially inducing flutter in said filmstrip.

4. The method of claim 3 further comprising light-tightly covering said scroll chamber.

5. The method of claim 1 further comprising retaining said cartridge in said camera frame assembly during said advancing.

6. The method of claim 1 further comprising, during said supporting step, venting exhaust fluid adjacent ends of said film space.

7. The method of claim 1 wherein said supporting step further comprises supplying a continuous pressurized gas stream to said scroll chamber.

8. The method of claim 1 wherein said supporting step further comprises supplying a pulsed pressurized gas stream to said scroll chamber.

9. The method of claim 1 further comprising guiding said filmstrip into said film space with a fluid stream.

10. A film loading apparatus, for use with: a camera frame assembly including a camera frame having a cartridge chamber, a scroll chamber, and an intermediate section disposed between said chambers; and a film cartridge disposed in said cartridge chamber, said film cartridge having a case and a filmstrip; said film loading apparatus comprising:

a receiver for the camera frame assembly, said receiver defining sites for said chambers and said intermediate section;

a film transport disposed to propel said film from said cartridge to said scroll chamber;

a supply of pressurized gas;

a plurality of nozzles connected to said supply, said nozzles being disposed to deliver said pressurized gas to said scroll chamber site and form a gas bearing between the filmstrip and the camera frame.

11. The apparatus of claim 10 wherein the scroll chamber has an upwardly directed throat and at least one of said nozzles is disposed, in spaced relation to said frame, to deliver said pressurized gas to said scroll chamber site through said throat.

12. The apparatus of claim 10 wherein the camera frame assembly has a film drive having a film engagement member at least partially disposed in said intermediate section, and said apparatus further comprises a film bridge disposed over the intermediate section site, said film bridge defining a film path extending from the cartridge chamber site to the scroll chamber site, said film path being spaced apart from the film engagement member.

13. The apparatus of claim 12 wherein said film bridge includes said film transport.

14. The apparatus of claim 13 wherein said film bridge is a vacuum-air belt.

15. The apparatus of claim 10 wherein said scroll chamber has at least one fluid inlet, at least one of said nozzles is disposed to deliver said pressurized gas to said scroll chamber site through said throat, and at least one of said nozzles is disposed to deliver said pressurized gas to said scroll chamber site through said at least one fluid inlet.

16. The apparatus of claim 10 wherein said receiver defines a cylindrical film space within said scroll chamber site, and at least one of said nozzles is disposed to deliver said pressurized gas in a direction substantially tangent to said film space.

17. The apparatus of claim 16 wherein two of said nozzles are disposed to deliver said pressurized gas in directions substantially tangent to said film space and a third of said nozzles is disposed to deliver said pressurized gas in a direction substantially radial to said film space.

18. The apparatus of claim 16 wherein said receiver defines a cylindrical film space within said scroll chamber site, and at least one of said nozzles is disposed to deliver said pressurized gas in a direction substantially radial to said film space.

19. The apparatus of claim 16 wherein said receiver defines a cylindrical film space within said scroll chamber site, and each of said nozzles is disposed to deliver said pressurized gas in a direction substantially radial to said film space.

20. The apparatus of claim 14 further comprising, a cartridge mover disposed to place said cartridge in said cartridge chamber.

21. A film loading apparatus, for use with: a camera frame assembly including a camera frame having a cartridge chamber, a scroll chamber, and an intermediate section disposed between said chambers; and a film cartridge disposed in said cartridge chamber, said film cartridge having a case and a filmstrip; said film loading apparatus comprising:

a receiver for the camera frame assembly, said receiver defining sites for said chambers and said intermediate section;

a film transport disposed to propel said film from said cartridge to said scroll chamber;

a supply of pressurized gas;

a nozzle connected to said supply and disposed to deliver said pressurized gas to said scroll chamber site and form a gas bearing between the filmstrip and the camera frame.

22. The apparatus of claim 21 wherein the scroll chamber has an upwardly directed throat and said nozzle is disposed, in spaced relation to said frame, to deliver said pressurized gas to said scroll chamber site through said throat.

23. The apparatus of claim 21 wherein said receiver defines a cylindrical film space within said scroll chamber site, and said nozzle is disposed to deliver said pressurized gas in a direction substantially tangent to said film space.

24. A camera comprising:

a camera frame having a cartridge chamber, a scroll chamber, and an intermediate section disposed between said chambers, said scroll chamber having a wall defining a substantially cylindrical film space and a throat, said scroll chamber having at least one exhaust passage extending outward from said film space, said scroll chamber having a plurality of fluid inlets extending outward from said film space below said throat, said fluid inlets each being disposed in a different quadrant of said scroll chamber.

25. The camera of claim 24 further comprising a cover member disposed to render each of said fluid inlets light-tight.

26. The camera of claim 24 wherein said cylindrical film space has an axis and said scroll chamber defines a pair of opposed exhaust passages axially adjoining said film space.

27. The camera of claim 24 wherein said scroll chamber defines a circumferential exhaust passage adjoining and extending outward from said film space.

28. The camera of claim 26 wherein said scroll chamber has a pair of opposed ends and said exhaust passages extend axially outward from said film space at each end.

29. The camera of claim 26 wherein said scroll chamber has a pair of opposed ends and said exhaust passages extend upward from said film space at each end.

* * * * *